United States Patent
Jones

(10) Patent No.: US 7,810,331 B2
(45) Date of Patent: Oct. 12, 2010

(54) METHOD FOR CAPTURING ENERGY FROM MECHANICAL ACTIONS ASSOCIATED WITH RECOVERY OF UNDERGROUND FLUIDS

(75) Inventor: Dan Jones, Valley Mills, TX (US)

(73) Assignee: Epi-Energy, Ltd., Dallas, TX (US)

( * ) Notice: Subject to any disclaimer, the term of this patent is extended or adjusted under 35 U.S.C. 154(b) by 379 days.

(21) Appl. No.: 10/962,629

(22) Filed: Oct. 12, 2004

(65) Prior Publication Data

US 2006/0075748 A1 Apr. 13, 2006

(51) Int. Cl.
  *F03G 7/00* (2006.01)
(52) U.S. Cl. ...................................... 60/641.2
(58) Field of Classification Search ............... 60/641.2, 60/495–496
  See application file for complete search history.

(56) References Cited

U.S. PATENT DOCUMENTS

| | | | |
|---|---|---|---|
| 81,329 A | 8/1868 | Barden | |
| 107,432 A | 9/1870 | Zeigler | |
| 850,597 A | 4/1907 | McCanna | |
| 955,458 A | 4/1910 | Hampton | |
| 1,141,626 A | 6/1915 | Granville | |
| 1,270,950 A | 7/1918 | Johanson | |
| 1,538,008 A | 5/1925 | Sharkey | |
| 1,538,328 A | 5/1925 | Holdener | |
| 1,770,016 A | 7/1930 | Ruliancich | |
| 1,833,993 A | 12/1931 | Hill | |
| 2,475,504 A | 7/1949 | Jackson | |
| 3,037,400 A | 6/1962 | Sundt | |
| 3,043,164 A | 7/1962 | Sundt | |
| 3,487,228 A * | 12/1969 | Bernard | 290/52 |
| 3,515,889 A * | 6/1970 | Kammerer | 290/53 |
| 3,668,947 A | 6/1972 | Waldorf | |
| 4,099,427 A | 7/1978 | Fickelscher | |
| 4,193,324 A | 3/1980 | Marc | |
| 4,227,422 A | 10/1980 | Kawashima | |
| 4,280,328 A * | 7/1981 | Falconer | 60/641.12 |
| 4,285,401 A * | 8/1981 | Erickson | 166/303 |
| 4,297,087 A * | 10/1981 | Akkerman | 417/378 |
| 4,360,881 A * | 11/1982 | Martinson | 700/298 |
| 4,489,242 A * | 12/1984 | Worst | 307/10.1 |
| 4,598,211 A * | 7/1986 | Koruthu | 290/53 |
| 5,141,173 A * | 8/1992 | Lay | 244/2 |
| 5,186,822 A * | 2/1993 | Tzong et al. | 210/122 |
| 5,292,289 A | 3/1994 | Ogata | |
| 5,324,240 A | 6/1994 | Guttinger | |
| 5,448,889 A * | 9/1995 | Bronicki | 60/641.14 |

(Continued)

OTHER PUBLICATIONS

U.S. Appl. No. 10/869,303, filed Jun. 16, 2004, Jones.

(Continued)

*Primary Examiner*—Hoang M Nguyen
(74) *Attorney, Agent, or Firm*—Fulbright & Jaworski L.L.P.

(57) ABSTRACT

A method for capturing energy from mechanical actions associated with recovery of underground fluids, and for improving the economic feasibility of low producing, but viable, oil wells. The present method captures energy associated with an oil well pump device and waste water as each fall under the influence of gravity. This energy is converted into a premium form, stored in an easily verified and metered form, and sold on a market, in accordance with a legislative scheme.

12 Claims, 3 Drawing Sheets

U.S. PATENT DOCUMENTS

| | | |
|---|---|---|
| 5,697,868 A | 12/1997 | Akeel |
| 6,220,115 B1 | 4/2001 | Hirn |
| 6,280,359 B1 | 8/2001 | Moskob |
| 6,336,881 B1 | 1/2002 | Rapp |
| 6,428,437 B1 | 8/2002 | Schlanger |
| 6,453,772 B1 | 9/2002 | Moskob |
| 6,490,941 B1 | 12/2002 | Hur |
| 6,512,966 B2 | 1/2003 | Lof |
| 7,127,328 B2 * | 10/2006 | Ransom ................ 700/286 |

OTHER PUBLICATIONS

U.S. Appl. No. 10/945,529, filed Sep. 20, 2004, Jones.
U.S. Appl. No. 10/963,104, filed Oct. 12, 2004, Jones.
Sumitomo Machinery Corporation of America, A Unique Concept in Speed Reducers & Gearmotors, 2002, United States.

* cited by examiner

METHOD FOR CAPTURING ENERGY FROM MECHANICAL ACTIONS ASSOCIATED WITH RECOVERY OF UNDERGROUND FLUIDS

BACKGROUND OF THE INVENTION

1. Field of the Invention

The present invention generally relates to a method for capturing energy from mechanical actions associated with recovery of underground fluids. More specifically, Applicant's invention relates to a method by which energy is recovered from a power source that is derived directly from a natural mechanism of the environment, that is, gravity. As an oil well pump device, or waste water, fall under the influence of gravity their associated energy is recovered. The recovered energy is then converted to a fungible, premium unit of energy, and stored in an easily metered and easily verified form. Finally, the recovered energy may be either sold on a market at a premium price or circulated though the production facility power supply.

2. Background Information

The proliferation of oil well production and society's dependence on that production is profound to say the least. Oil production, and improvements thereof, serves as tremendous motivation not only to explore for and develop new wells, but to improve the quality/efficiency of existing wells. It comes as no surprise that billions of dollars are spent each year on means intended to maintain and improve the production of in-place oil wells. Nevertheless, despite the tremendous resources thrown towards increasing oil well performance, all oil wells become economically infeasible at some point.

Such economic infeasibility is largely determined in terms of a general cost-benefit analysis. That is, the cost associated with maintenance of the particular oil well must be balanced against the production of the well. As time goes on, this balance inevitably tips in favor of heavy cost and low benefit. This is especially true as a production facility is forced to expend more energy to force production from a low pressure or low-level well. As a result, economics mandate that oil wells be abandoned, even when they are capable of viable production. Applicant's invention provides a system by which the life of low producing wells can be prolonged, and previous shut-in and abandoned wells can be reopened and operated in an economically profitable manner. In fact, the present method is envisioned as an improvement of such magnitude that generally accepted standards for shutting in non-economic wells will be completely abandoned. Applicant's invention establishes a method by which typically wasted energy associated with oil well production is captured, stored in an easily metered and verified form, and then sold under a legislative scheme at a premium price.

There are several legislative programs currently in place that provide financial incentives for the production of energy from renewable power sources. For example, quotas are sometimes placed on power providers to provide a certain amount of energy from renewable power sources as part of their energy portfolio. This renewable energy, sometimes referred to as "green energy," is highly desirable in that it protects and enhances the quality of the environment.

Presently, there are systems available that commercialize energy produced from a renewable power source. For instance, in U.S. Pat. No. 6,512,966 issued to Lof, et. al ("Lof Patent"), a system is described where wind energy is identified and harvested, converted, and then sold and delivered on a market. However, there are no systems known in the art that encompass all of the novel attributes of the present invention, and are able to commercialize renewable energy from an oil well production facility.

Currently, the industry practice for oil well production is to lift an oil mixture to the surface of the earth by use of a pump. The pump is engaged with, and powered by, an electrical source. Commonly, the pump actuates between a top position and a bottom position during operation. As the pump moves from the bottom position to the top position, the electrical power source is relied upon to provide the power to initiate and sustain such movement. However, as the pump completes its cycle by moving from the top position to the bottoms position, a series of counterweights are relied upon to steady the pumps movement. The electrical power source is generally not involved as the pump moves from its top position to its bottom position.

There is a significant amount of energy associated with the pump device as it falls between its top position and its bottom position. This associated energy can be measured in terms of the difference in potential energy of the pump at its top position and the potential energy of the pump at its bottom position. Therefore, it is easily seen that pumps having the greatest range of motion and having the greatest mass contain the most associated energy.

Currently, there are no known systems that harvest the energy associated with an oil well pump device as it falls under the influence of gravity. This energy, falls within the general definition of "green energy" as it is not a product of fossil fuel, but rather is a product of a natural mechanism (gravity) of the environment. Applicant's invention, unlike any currently available systems, captures and commercializes the energy associated with the falling pump.

Energy from the pump device is not the only wasted energy with typical oil well production facilities. That is, as these production facilities bring oil to the surface, that oil is often mixed with water. This "waste water" is transferred to a disposal site, where it is dumped down another well. Presently, there are no known systems that harvest the energy associated with this falling water. And, as seen before, the energy of this water can be measured by the difference in potential energy of the water at the wellhead and the potential energy of the water at the bottom of the well. Again, this energy is appropriately defined as "green energy" as it is not a product of fossil fuel, but rather is a product of natural mechanism (gravity) of the environment.

In light of the global impact associated with oil production and the economic restraints on such production, a great need exists for a system whereby such restraints are not only alleviated, but eliminated. Applicant's invention provides such a system. In fact, by harvesting previously wasted energy at a premium price, the present system makes almost any viable well economically profitable.

SUMMARY OF THE INVENTION

In view of the foregoing, it is an object of the present invention to provide a method for developing the commercial value of renewable energy recovered from an oil well production facility wherein energy typically wasted in such production facility is captured.

It is another object of the present invention to provide a method for developing the commercial value of renewable energy recovered from an oil well production facility wherein said renewable energy is produced from a natural mechanism of the environment.

It is another object of the present invention to provide a method for developing the commercial value of renewable energy recovered from an oil well production facility wherein the energy associated with an oil well pump device as it moves from its top position to its bottom position is captured.

It is another object of the present invention to provide a method for developing the commercial value of renewable energy recovered from an oil well production facility wherein the energy associated with waste water as it moves from a well head to the bottom of a well is captured.

It is another object of the present invention to provide a method for developing the commercial value of renewable energy recovered from an oil well production facility wherein said renewable energy is converted to electrical energy.

It is another object of the present invention to provide a method for developing the commercial value of renewable energy recovered from an oil well production facility wherein said renewable energy is stored so that it may easily be verified and metered.

It is another object of the present invention to provide a method for developing the commercial value of renewable energy recovered from an oil well production facility wherein said renewable energy is sold on a market.

It is another object of the present invention to provide a method for developing the commercial value of renewable energy recovered from an oil well production facility wherein said renewable energy is sold on a market, at a premium, to one or more electricity providers.

It is another object of the present invention to provide a method for developing the commercial value of renewable energy recovered from an oil well production facility wherein said renewable energy is circulated though that production facility's power supply.

It is yet another object of the present invention to provide a method for developing the commercial value of renewable energy recovered from an oil well production facility wherein a standard recovery means is replaced by a high-efficiency reducer-type driven recovery means In satisfaction of these and other related objectives, Applicant's invention provides a method for developing the commercial value of renewable energy recovered from an oil well production facility. This method incorporates novel ideas including recovery of renewable energy associated with a falling oil well pump device and falling waste water, selling the captured energy in accordance with a legislative scheme at a premium price, and a novel substitute for a standard recovery means.

Commencement of the present method begins as an oil well recovery apparatus pumps a recovered oil mixture to the surface. During operation, this oil recovery apparatus reciprocates between a top position and a bottom position, as known in the art. With facilities known in the art, a driving means is attached to said recovery device to lift the device from its bottom position to its top position. However, the driving means remains essentially dormant as the recovery device falls from a top position to a bottom position. As a result, the associated energy of the falling recovery device is ignored- there is no attempt to recover such energy whatsoever.

The present invention, however, captures the energy associated with the falling pump. This is done by attaching any standard generator means to the pumping device. As the pump falls, the generator means is driven and produces electrical energy. This energy is then transferred to a storage means, where it is stored in an easily verified and metered form. As the recovery means moves from a bottom position to a top position, the generator means may act as a motor- consuming energy to lift the recovery means.

Applicant's invention captures other energy that is typically wasted in standard oil production facilities as well. That is, as the oil mixture is brought to the surface, the mixture is separated into produced oil and "waste water." This wastewater is typically then dropped back into a disposal well. In standard oil recovery facilities, this wastewater is dropped into the disposal with no attempt to recover any of the energy expended in bringing that water to the surface. The present invention, however, captures the energy associated with the water as if falls downhole. Again, this can be done simply by attaching a standard generating means along the disposal site so that the falling water drives the generator. As the wastewater falls, the generator means produces electrical energy. This energy is then transferred to a storage means, where it is stored in an easily verified and metered form.

It is important to consider that once the energy is captured from each of these sources, the stored energy can be utilized in more than one way to improve the economic profitability of the oil production facility, or any surrounding related facilities. First, the recovered energy can be directly cycled through the production facility's power supply. In such case, the energy recovered onsite is combined with incoming purchased energy. It is easily seen that combining the incoming energy and the recovered energy reduces the amount of incoming (purchased) energy required to maintain the recovery process. In a similar fashion, the energy recovered at a particular production facility can be distributed to other production facilities within the same oil well field, or some other related production facilities. Again, combining recovered energy with incoming energy reduces the amount of incoming energy required to maintain the recovery process of the related facilities.

A second option for utilizing the energy recovered onsite is to sell the energy, preferably at a premium price. As mentioned, there are several legislative schemes in place that mandate the purchase of "green energy," by energy providers, at a premium price. Typically, green energy is defined in terms of energy produced by a natural mechanism of the environment, rather than being a product of fossil fuels. Because the energy recovered onsite is the product of gravity, it seems safe to say that the recovered energy (both from the pump device and the waste water), appropriately falls within the definition of green energy. As such, a preferred version of the current method involves selling the recovered energy, according to such a legislative scheme, to an energy provider at a premium price.

In the preferred form of the present method, the economic profitability of an oil production facility is further increased by substituting a novel drive mechanism replacement for a typical oil recovery device, or "pumpjack." The typical Pumpjack is hindered by a loss in mechanical efficiency due to inefficient motors, belts, sliding part friction, and the like. However, by using a novel reducer-type driving means to actuate a pump, in place of a standard pump driving means, mechanical loss associated with standard pumpjacks is avoided. This reducer type driving mechanism is best described in copending U.S. Patent Application, "A Device for Actuating a Reciprocating Recovery Means for Underground Fluid," filed on Oct. 12, 2004, having U.S. Express Mail # EV 298572059 US, a copy of which accompanies this application as appendix A. In addition, use of the improved drive mechanism eliminates the need for counterweights along the opposing side of the pumping device. This is so, as the reducer type drive mechanism further takes advantage of the angular momentum associated with the moving Pumpjack.

BRIEF DESCRIPTION OF THE DRAWINGS

Applicant's invention may be further understood from a description of the accompanying drawings, wherein unless otherwise specified, like referenced numerals are intended to depict like components in the various views.

DETAILED DESCRIPTION OF THE PREFERRED EMBODIMENT

Figure 1:
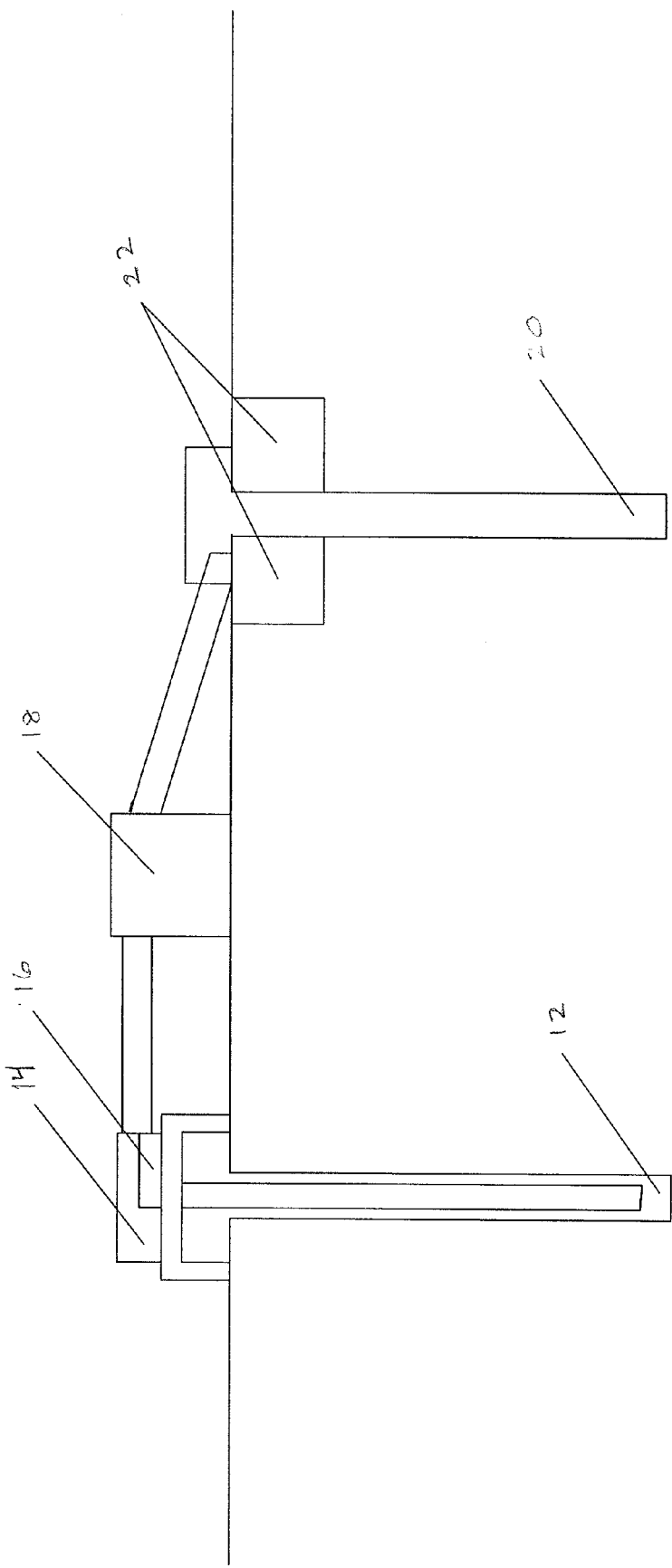
FIG. 1 is a cross sectional view of the primary components of the method of the present invention.
Figure 2:
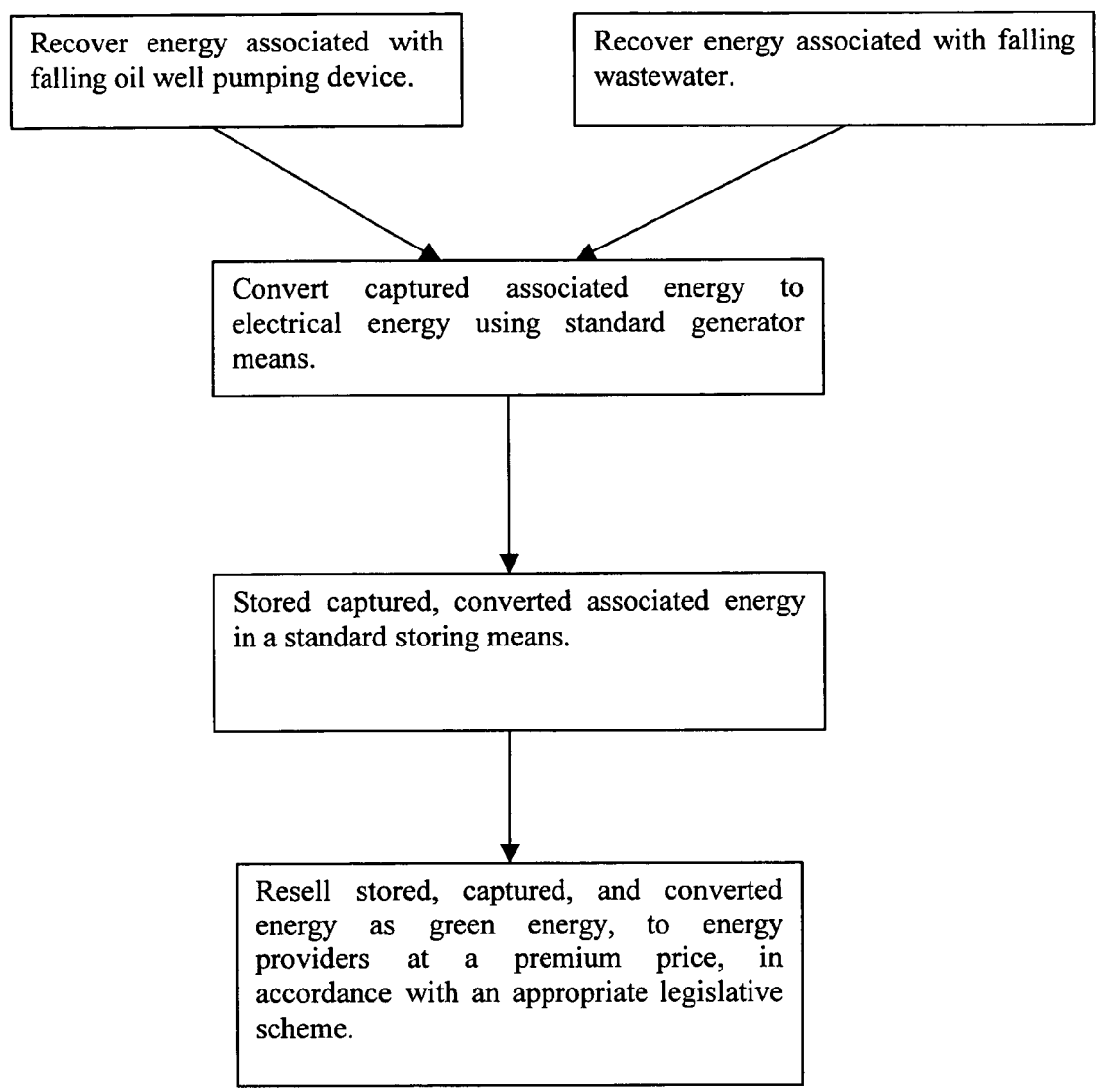
FIG. 2 is a flow chart of the primary steps involved in the preferred embodiment of the method of the present invention.
Figure 3:
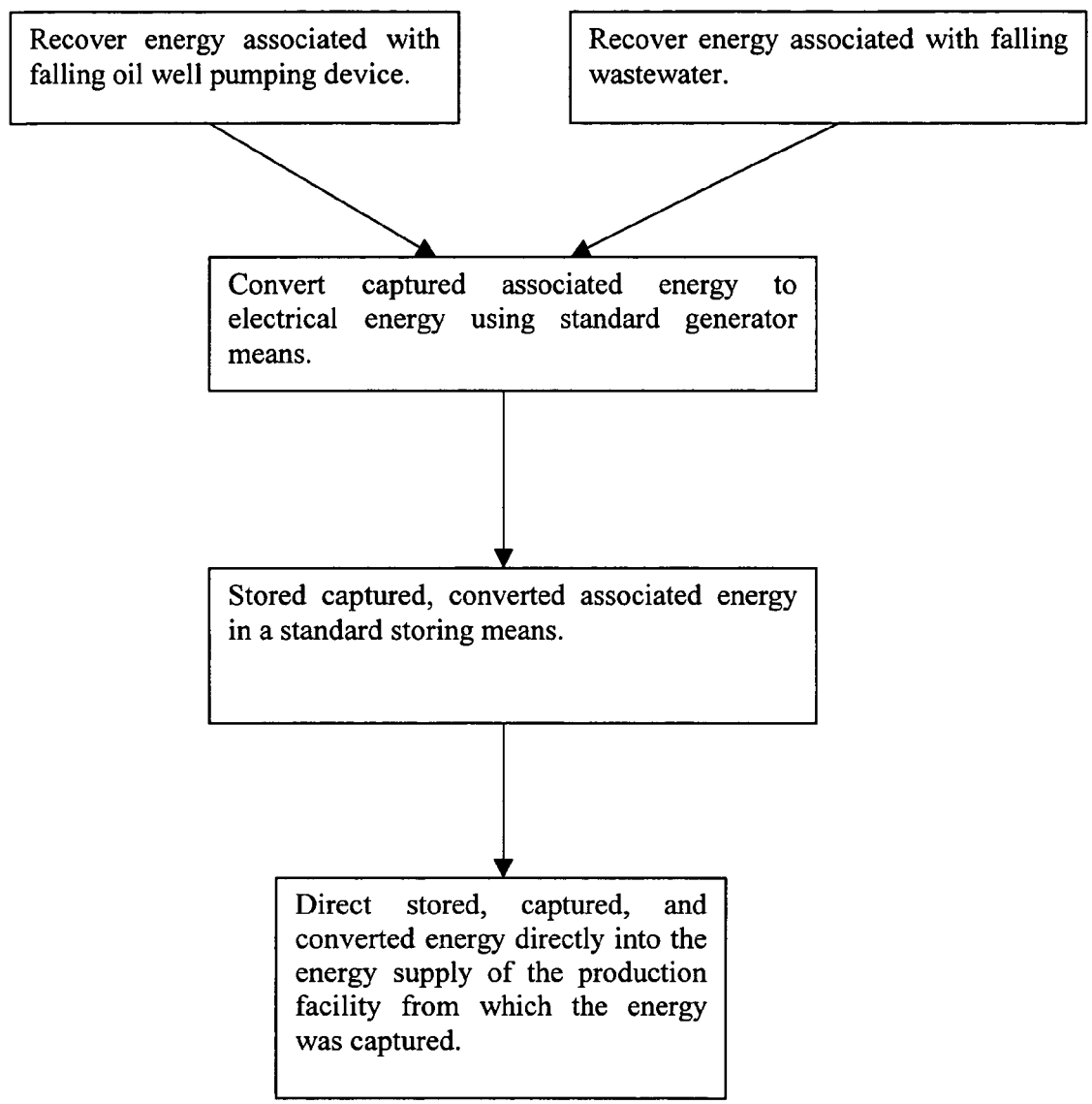
FIG. 3 is a flow chart of the primary steps involved in an alternative embodiment of the method of the present invention.

With reference to FIG. 1, the primary components concerning the method for capturing energy from mechanical actions associated with recovery of underground fluids are shown in block diagram form. With reference to FIG. 2 and FIG. 3, a flow chart type diagram shows the primary steps concerning the preferred embodiment and an alternative embodiment of the present method, respectively.

As best seen in FIG. 1, oil well 12 is shown. In the preferred embodiment, oil well 12 is any standard oil well, although the present method is thought to be most useful in low producing or low-pressure oil wells.

Recovery means 14 is positioned at oil well 12, along the surface. In the preferred embodiment, recovery means 14 is driven by an improved reducer-type gear mechanism that replaces standard drive mechanisms. Use of such a reducer-type mechanism in combination with such a recovery means eliminates the mechanical operating efficiencies typically associated with standard recovery means drive mechanisms, such as common Pumpjack drive mechanisms. These mechanical inefficiencies are due to interaction of component pieces, sliding friction, and wear and tear. In addition, employment of this reducer-type recovery means eliminates the need for counterweights, and allows the recovery means to further take advantage of the angular momentum of the pump device as it reciprocates. The improved reducer type drive mechanism of the preferred embodiment is best described in copending U.S. Patent Application Ser. No. 11/841,519, "A Device for Actuating a Reciprocating Recovery Means for Underground Fluid," filed on Oct. 12, 2004, having U.S. Express Mail # EV 298572059 US, a copy of which accompanies this application as appendix A.

Oil well generator means 16 is engaged with recovery means 14 so that as recovery means 14 falls from a top position to a bottom position, generator means 16 is activated. Generator means 16, which may be any suitable type generator as will be apparent to those skilled in the art, generates electricity as it is activated by falling recovery means 14. The electrical energy generated by generating means 16 is then sent to storage means 18, where, as will be further discussed, the electrical energy is further distributed. Further, generator means 16 may be integrated as a combined power input means and power generation means, having two distinct modes. In a first mode, means 16 consumes energy when driving recovery means 14. In a second mode, means 16 produces energy when driven by recovery means 14. In such an embodiment, means 16 further comprises an electrical switching means. The electrical switching means actuates between a first mode and a second mode. In a first mode between an interface between said combined power input means and power generation means and a source of power for driving said combined power input means and power generation means. In a second mode, a second interface between said combined said power input means and power generation means and said power reception means.

Disposal well 20 receives and holds wastewater extracted from the oil production mixture brought to the surface by recovery means 14. In the preferred embodiment, disposal well 20 may be of almost any form with respect to continuity or structure.

Disposal well generator means 22 is positioned along disposal well 20 at the surface. Generator means 22 may be any standard type generator as will be apparent to those skilled in the art, and, in any event will have some generator/water interface means such as a turbine. Generator means 22 is activated by wastewater falling downhole of disposal well 20. The electrical energy generated by generating means 22 is then sent to storage means 18, where, as will be further discussed, the electrical energy is further distributed.

The current method contemplates more than one avenue for the energy received at, and stored by energy storing means 18. That is, the current method presents two options for increasing the economic viability of an oil production facility. First, the energy recovered may be placed directly back into the facility power supply. This closed-loop type arrangement greatly reduces the amount of external energy needed to support oil production. As a result, oil wells that were once economically impractical become profitable as they are powered, in part, by recovered energy.

However, the preferred embodiment of the present method incorporates another option. This preferred option involves selling the stored energy, appropriately classified as "grren energy," at a premium price. Such premium price, as mentioned, is mandated by particular legislative schemes under which energy would be sold.

Although the invention has been described with reference to specific embodiments, this description is not meant to be construed in a limite sense sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention.

I claim:
1. A system for recovering energy, said system comprising:
a recovery device, said recovery device actuated, at least in part, by a mechanism of the natural environment;
a generating device in communication with said recovery device, said generating device operable to generate electrical energy in response to said actuation of said recovery device;
a distribution device operable to distribute said generated electrical energy to at least said recovery device, and
a storage device for receiving and storing said generated electrical energy from said distribution device;
wherein said recovery device is a downhole pump and wherein said generating device functions as a generator when said recovery device moves in a first direction and functions as a motor when said recovery device moves in a second direction.
2. The system of claim 1 wherein said generator is downhole.

3. The system of claim 1 wherein said distribution device distributes said generated electrical energy in accordance with one or more legislative schemes that favors renewable energy.

4. The system of claim 1 further comprising a site for receiving waste water associated with said downhole pump.

5. The system of claim 4 further comprising a second generating device disposed at said site, said second generating device operable to generate electrical energy in response to the motion of said waste water; and
   a second distribution device operable to distribute said second generated electrical energy.

6. A method for recovering energy, said method comprising:
   actuating a recovery device under the influence of a mechanism of the natural environment;
   generating electrical energy in response to said actuation of said recovery device;
   distributing said generated electrical energy to said recovery device, wherein said distribution is accomplished by a distribution device; and
   storing said generated electrical energy, wherein said storing is accomplished by a storage device receiving said generated electrical energy from said distribution device;
   wherein said recovery device is a downhole pump and wherein said generating is accomplished by a generating device functioning as a generator when said recovery device moves in a first direction and functions as a motor when said recovery device moves in a second direction.

7. The method of claim 6 wherein said generator is downhole.

8. The method of claim 6 wherein said distributing comprises distributing said generated electrical energy in accordance with one or more legislative schemes that favors renewable energy.

9. The method of claim 6 further comprising transferring waste associated with said recovering to a storage site.

10. The method of claim 9 further comprising generating electrical energy in response to the motion of said waste; and
    distributing said electrical energy generated in response to the motion of said waste to at least said recovery device.

11. A system for recovering energy, said system comprising:
    a recovery device, said recovery device actuated, at least in part, by a mechanism of the natural environment;
    a generating device in communication with said recovery device, said generating device operable to generate electrical energy in response to said actuation of said recovery device; and
    a storage device for receiving and storing said generated electrical energy from said generating device;
    wherein said recovery device is a downhole pump and wherein said generating device functions as a generator when said recovery device moves in a first direction and functions as a motor when said recovery device moves in a second direction.

12. A method for recovering energy, said method comprising:
    actuating a recovery device under the influence of a mechanism of the natural environment;
    generating electrical energy in response to said actuation of said recovery device;
    storing said generated electrical energy in a storage device;
    distributing said stored energy to at least said storage device, wherein said distribution is accomplished by a distribution device;
    wherein said recovery device is a downhole pump and wherein said generating is accomplished by a generating device functioning as a generator when said recovery device moves in a first direction and functions as a motor when said recovery device moves in a second direction.

* * * * *